US007695359B2

(12) United States Patent
Gail et al.

(10) Patent No.: US 7,695,359 B2
(45) Date of Patent: Apr. 13, 2010

(54) "BUY A PEEK" GAMING METHODS AND DEVICES

(75) Inventors: Ted Gail, Reno, NV (US); Bryan Wolf, Reno, NV (US); Larry Hollibaugh, Reno, NV (US)

(73) Assignee: IGT, Reno, NV (US)

(*) Notice: Subject to any disclaimer, the term of this patent is extended or adjusted under 35 U.S.C. 154(b) by 832 days.

(21) Appl. No.: 11/026,860

(22) Filed: Dec. 30, 2004

(65) Prior Publication Data

US 2006/0025193 A1 Feb. 2, 2006

Related U.S. Application Data

(60) Provisional application No. 60/592,410, filed on Jul. 30, 2004.

(51) Int. Cl.
*A63F 13/00* (2006.01)

(52) U.S. Cl. .......................................... 463/13; 463/22

(58) Field of Classification Search .................. 463/13, 463/16, 19, 42, 25, 29
See application file for complete search history.

(56) References Cited

U.S. PATENT DOCUMENTS 3,628,259 A 12/1971 Kahn
4,156,976 A 6/1979 Mikun
4,157,829 A 6/1979 Goodman et al.
4,332,389 A 6/1982 Loyd, Jr. et al.
4,335,809 A 6/1982 Wain
4,339,798 A 7/1982 Hedges et al.
4,365,810 A 12/1982 Richardson
4,373,726 A 2/1983 Churchill et al.
4,448,419 A 5/1984 Telnaes
4,455,025 A 6/1984 Itkis
4,467,424 A 8/1984 Hedges et al.
4,494,197 A 1/1985 Troy et al.
4,582,324 A 4/1986 Koza et al.
4,624,462 A 11/1986 Itkis
4,652,998 A 3/1987 Koza et al.

(Continued)

FOREIGN PATENT DOCUMENTS

EP 0769769 4/1997

(Continued)

OTHER PUBLICATIONS

International Search Report & Written Opinion of the International Searching Authority dated Nov. 1, 2005, for PCT App No. PCT/US2004/029912.

(Continued)

*Primary Examiner*—John M Hotaling, II
*Assistant Examiner*—Jeffrey Wong
(74) *Attorney, Agent, or Firm*—Weaver Austin Villeneuve & Sampson LLP

(57) ABSTRACT

The present invention provides methods and devices for providing wagering games. A player pays an initial price to play a wagering game according to normal game rules. Game information that would normally be concealed from the player is offered for an additional price. In some implementations, the wagering game is a poker game and the game information is draw card information. The additional price may increase according to the amount of game information provided. In some implementations, a paytable percentage for the wagering game decreases according to the amount of game information provided.

22 Claims, 10 Drawing Sheets

U.S. PATENT DOCUMENTS 4,669,730 A 6/1987 Small
4,689,742 A 8/1987 Troy et al.
4,743,022 A * 5/1988 Wood .......................... 463/13
4,798,387 A 1/1989 Richardson
4,805,907 A 2/1989 Hagiwara
4,815,741 A 3/1989 Small
4,817,951 A 4/1989 Crouch et al.
4,842,278 A 6/1989 Markowicz
4,848,771 A 7/1989 Richardson
4,856,787 A 8/1989 Itkis
4,982,337 A 1/1991 Burr et al.
5,007,649 A 4/1991 Richardson
5,011,159 A 4/1991 Fortunato et al.
5,042,809 A 8/1991 Richardson
5,092,598 A 3/1992 Kamille
5,100,137 A * 3/1992 Fulton ......................... 463/13
5,100,139 A 3/1992 Di Bella
5,145,182 A 9/1992 Swift et al.
5,158,293 A 10/1992 Mullins
5,167,413 A 12/1992 Fulton
5,224,706 A 7/1993 Bridgeman et al.
5,242,163 A 9/1993 Fulton ........................ 273/138
5,265,874 A 11/1993 Dickinson et al.
5,275,400 A 1/1994 Weingardt et al.
5,276,312 A 1/1994 McCarthy
5,282,620 A 2/1994 Keesee
5,294,120 A 3/1994 Schultz
5,294,128 A 3/1994 Marquez
5,297,802 A 3/1994 Pocock et al.
5,324,035 A 6/1994 Morris et al.
5,351,970 A 10/1994 Fioretti
5,393,057 A 2/1995 Marnell, II
5,398,932 A 3/1995 Eberhardt et al.
5,401,023 A 3/1995 Wood
5,407,199 A 4/1995 Gumina
5,489,101 A 2/1996 Moody
5,511,781 A 4/1996 Wood et al.
5,531,448 A 7/1996 Moody
5,542,669 A 8/1996 Charron et al.
5,570,885 A 11/1996 Ornstein
5,584,486 A 12/1996 Franklin
5,588,913 A 12/1996 Hecht
5,593,161 A 1/1997 Boylan et al.
5,628,684 A 5/1997 Boudec
5,630,754 A 5/1997 Rebane
5,639,088 A 6/1997 Schneider et al.
5,674,128 A 10/1997 Holch et al.
5,678,001 A 10/1997 Nagel et al.
5,707,285 A 1/1998 Place et al.
5,711,715 A 1/1998 Ringo et al.
5,718,431 A 2/1998 Ornstein
5,722,891 A 3/1998 Inoue
5,732,950 A 3/1998 Moody
5,755,619 A 5/1998 Matsumoto et al.
5,775,692 A 7/1998 Watts et al.
5,779,545 A 7/1998 Berg et al.
5,791,987 A 8/1998 Chen et al.
5,800,269 A 9/1998 Holch et al.
5,816,916 A 10/1998 Moody
5,823,873 A 10/1998 Moody
5,823,874 A 10/1998 Adams
5,833,537 A 11/1998 Barrie
5,833,540 A 11/1998 Miodunski et al.
5,848,932 A 12/1998 Adams
5,851,011 A * 12/1998 Lott .......................... 273/292
5,868,619 A 2/1999 Wood et al.
5,871,398 A 2/1999 Schneier et al.
5,882,258 A 3/1999 Kelly et al.
5,882,260 A 3/1999 Marks et al.
5,944,606 A 8/1999 Gerow
5,949,042 A 9/1999 Dietz et al.
5,951,396 A 9/1999 Tawil
5,954,335 A 9/1999 Moody
5,954,582 A 9/1999 Zach
5,976,016 A 11/1999 Moody et al.
5,984,310 A * 11/1999 English ...................... 273/292
5,984,779 A 11/1999 Bridgeman et al.
6,007,066 A 12/1999 Moody
6,007,424 A 12/1999 Evers et al.
6,012,720 A 1/2000 Webb
6,012,981 A 1/2000 Fujioka et al.
6,012,984 A 1/2000 Roseman
6,017,032 A 1/2000 Grippo et al.
6,024,640 A 2/2000 Walker et al.
6,062,980 A 5/2000 Luciano
6,079,711 A 6/2000 Wei et al.
6,089,982 A 7/2000 Holch et al.
6,093,100 A 7/2000 Singer et al.
6,098,985 A 8/2000 Moody
6,120,378 A 9/2000 Moody et al.
6,126,541 A 10/2000 Fuchs
6,126,542 A 10/2000 Fier
6,132,311 A 10/2000 Williams
6,146,271 A 11/2000 Kadlic
6,146,272 A 11/2000 Walker et al.
6,149,156 A 11/2000 Feola
6,149,521 A 11/2000 Sanduski
6,159,095 A 12/2000 Frohm et al.
6,168,521 B1 1/2001 Luciano et al.
6,174,233 B1 1/2001 Sunaga et al.
6,183,361 B1 2/2001 Cummings et al.
6,190,255 B1 2/2001 Thomas et al.
6,196,547 B1 3/2001 Pascal et al.
6,203,429 B1 3/2001 Demar et al.
6,210,275 B1 4/2001 Olsen
6,210,276 B1 4/2001 Mullins
6,217,448 B1 4/2001 Olsen
6,220,961 B1 4/2001 Keane et al.
6,241,606 B1 6/2001 Riendeau et al.
6,254,480 B1 7/2001 Zach
6,257,980 B1 7/2001 Santini, Jr.
6,273,424 B1 * 8/2001 Breeding .................... 273/292
6,273,820 B1 8/2001 Haste, III
6,280,325 B1 8/2001 Fisk
6,280,328 B1 8/2001 Holch et al.
6,309,298 B1 10/2001 Gerow
6,312,334 B1 11/2001 Yoeloff
6,325,716 B1 12/2001 Walker et al.
6,358,151 B1 3/2002 Enzminger et al.
6,368,218 B2 4/2002 Angell, Jr.
6,394,456 B1 * 5/2002 Long .......................... 273/292
6,398,645 B1 6/2002 Yoseloff
6,402,614 B1 6/2002 Schneier et al. ............... 463/17
6,419,583 B1 7/2002 Crumby et al.
6,425,824 B1 7/2002 Baerlocher et al.
6,450,885 B2 9/2002 Schneier et al.
6,454,648 B1 9/2002 Kelly et al.
RE37,885 E 10/2002 Acres et al.
6,475,086 B2 11/2002 Zach
6,494,454 B2 12/2002 Adams
6,508,711 B1 1/2003 Ono
6,524,184 B1 2/2003 Lind et al.
6,524,185 B2 2/2003 Lind
6,527,638 B1 3/2003 Walker et al.
6,533,664 B1 3/2003 Crumby
6,537,150 B1 3/2003 Luciano
6,554,283 B2 * 4/2003 Vancura et al. ............. 273/292
6,569,017 B2 5/2003 Enzminger et al.
6,575,467 B1 * 6/2003 Kal ........................... 273/292
6,585,590 B2 7/2003 Malone
6,599,187 B2 7/2003 Gerow
6,607,439 B2 8/2003 Schneier et al.
6,609,974 B2 8/2003 Mead et al.
6,612,927 B1 9/2003 Slomiany et al.

| | | | |
|---|---|---|---|
| 6,619,660 B2 | 9/2003 | Schaeger et al. | |
| 6,656,044 B1 | 12/2003 | Lewis | |
| 6,676,126 B1 | 1/2004 | Walker et al. | |
| 6,685,562 B1 | 2/2004 | Rantanen | |
| 6,695,695 B2 | 2/2004 | Angel | |
| 6,722,655 B1 | 4/2004 | Camero | |
| 6,729,621 B2 | 5/2004 | Moody | |
| 6,729,961 B1 | 5/2004 | Millerschone | |
| 6,733,385 B1 | 5/2004 | Enzminger et al. | |
| 6,739,970 B2 * | 5/2004 | Luciano | 463/18 |
| 6,743,102 B1 | 6/2004 | Fiechter et al. | |
| 6,749,500 B1 | 6/2004 | Nelson et al. | |
| 6,780,108 B1 | 8/2004 | Luciano, Jr. et al. | |
| 6,802,776 B2 | 10/2004 | Lind et al. | |
| 6,802,778 B1 * | 10/2004 | Lemay et al. | 463/42 |
| 6,805,629 B1 | 10/2004 | Weiss | |
| 6,840,858 B2 | 1/2005 | Adams | |
| 6,923,719 B2 | 8/2005 | Wolf | |
| 6,932,707 B2 | 8/2005 | Duhamel | |
| 7,059,966 B2 | 6/2006 | Luciano, Jr. et al. | |
| 7,481,707 B1 | 1/2009 | Luciano et al. | |
| 2001/0036855 A1 | 11/2001 | DeFrees-Parrott et al. | |
| 2001/0046892 A1 | 11/2001 | Santini, Jr. | |
| 2002/0010013 A1 | 1/2002 | Walker et al. | |
| 2002/0098882 A1 | 7/2002 | Lind et al. | |
| 2002/0098883 A1 | 7/2002 | Packes, Jr. et al. | |
| 2002/0113369 A1 | 8/2002 | Weingardt | |
| 2002/0132661 A1 | 9/2002 | Lind et al. | |
| 2002/0155877 A1 | 10/2002 | Enziminger et al. | |
| 2002/0196342 A1 | 12/2002 | Walker et al. | |
| 2003/0060257 A1 | 3/2003 | Katz et al. | |
| 2003/0060261 A1 | 3/2003 | Katz et al. | |
| 2003/0060276 A1 | 3/2003 | Walker et al. | |
| 2003/0125101 A1 | 7/2003 | Campo | |
| 2003/0127793 A1 | 7/2003 | Adams | |
| 2003/0144050 A1 | 7/2003 | Keaton et al. | |
| 2003/0162577 A1 * | 8/2003 | Hamud | 463/13 |
| 2003/0181231 A1 | 9/2003 | Vancura et al. | |
| 2003/0190943 A1 | 10/2003 | Walker et al. | |
| 2003/0216165 A1 | 11/2003 | Singer et al. | |
| 2003/0228899 A1 | 12/2003 | Evans | |
| 2003/0236116 A1 | 12/2003 | Marks et al. | |
| 2004/0023706 A1 | 2/2004 | Hunter et al. | |
| 2004/0036212 A1 | 2/2004 | Walker et al. | |
| 2004/0038723 A1 | 2/2004 | Schneier et al. | |
| 2004/0072604 A1 | 4/2004 | Toyoda | |
| 2004/0132523 A1 | 7/2004 | Staw | |
| 2004/0142747 A1 | 7/2004 | Pryzby | |
| 2004/0152508 A1 | 8/2004 | Lind et al. | |
| 2004/0166920 A1 | 8/2004 | Boyd | |
| 2004/0185932 A1 | 9/2004 | Lombardo | |
| 2004/0219969 A1 | 11/2004 | Casey et al. | |
| 2004/0259621 A1 | 12/2004 | Pfeiffer et al. | |
| 2005/0026665 A1 * | 2/2005 | Gerrard et al. | 463/13 |
| 2005/0037832 A1 | 2/2005 | Cannon | |
| 2005/0037834 A1 * | 2/2005 | Stern et al. | 463/20 |
| 2005/0054426 A1 | 3/2005 | Toyoda | |
| 2005/0059449 A1 | 3/2005 | Yarbrough | |
| 2005/0059469 A1 | 3/2005 | Gail et al. | |
| 2005/0096130 A1 | 5/2005 | Mullins | |
| 2005/0167916 A1 | 8/2005 | Banyai | |
| 2005/0221883 A1 | 10/2005 | Lind et al. | |
| 2005/0233798 A1 | 10/2005 | Van Asdale | |
| 2007/0093286 A1 | 4/2007 | Marshall | |
| 2007/0135211 A1 | 6/2007 | Block et al. | |
| 2007/0142113 A1 | 6/2007 | Walker et al. | |
| 2007/0197281 A1 | 8/2007 | Stronach | |

FOREIGN PATENT DOCUMENTS

| | | |
|---|---|---|
| EP | 199690 | 4/2002 |
| EP | 1341135 | 9/2003 |
| WO | WO 96/18174 | 6/1996 |
| WO | WO 01/99067 | 12/2001 |
| WO | WO 03063019 | 7/2003 |
| WO | WO 2004/095383 | 4/2004 |

OTHER PUBLICATIONS

EP Examiner's Communication, dated Jul. 3, 2006, from EP App No. 04783935.2.

EP Examiner's Communication, dated Jul. 3, 2006, from EP App No. 04784071.5.

EP Examiner's Communication, dated Oct. 25, 2006, from EP App No. 04784069.9.

US Restriction Requirement mailed Jun. 8, 2007, from U.S. Appl. No. 10/931,673.

US Office Action mailed Aug. 20, 2007, from U.S. Appl. No. 10/931,673.

US Office Action mailed Jul. 3, 2007, from U.S. Appl. No. 10/755,982.

International Search Report, mailed Jun. 6, 2007 from International App No. PCT/US2006/048264, 5 pp. including Notification of Transmittal.

Written Opinion of the International Searching Authority mailed Jun. 6, 2007 from International App No. PCT/US2006/048264, 7 pp.

International Search Report and Written Opinion of the International Searching Authority, mailed Jul. 4, 2007 from International Application No. PCT/US2006/047714, 11 pp including Notification of Transmittal.

US Office Action mailed Sep. 21, 2007, from U.S. Appl. No. 10/756,429.

US Office Action mailed Sep. 13, 2007, from U.S. Appl. No. 10/941,606.

US Office Action mailed Jun. 27, 2007, from U.S. Appl. No. 11/026,860.

Examination Report from Related European Patent Application No. 04 778 725.2, dated Oct. 22, 2007, 9 pages.

US Office Action mailed Dec. 21, 2007, from U.S. Appl. No. 11/026,860.

US Office Action mailed Mar. 17, 2008, from U.S. Appl. No. 10/937,227.

US Office Action mailed Sep. 12, 2007, from U.S. Appl. No. 10/969,127.

Dianomopoly Advertisement by International Gamco, Inc. published 2002. Electronic Tabs Advertisement by 21st Century Gaming, published 2002.

Lucky Times California Lottery Newsletter published 1996. Instant Winner Advertisement by Williams/WMS Gaming, publishe prior to 2002.

Play it again Advertisement by International Gamco, Inc. published 2000.

Aho et al., *Data Structures and Algorithms*, Addison-Wesley, 1983, pp. 13-16, 56-57, 260-261.

US Office Action dated Nov. 17, 2008 issued in U.S. Appl. No. 10/937,227.

US Final Office Action dated Apr. 3, 2009 issued in U.S. Appl. No. 10/969,127.

US Office Action dated Jun. 12, 2009 issued in U.S. Appl. No. 11/031,048.

US Final Office Action dated Jun. 17, 2009 issued in U.S. Appl. No. 10/937,227.

US Office Action dated Jul. 2, 2009 issued in U.S. Appl. No. 10/925,710.

* cited by examiner

"BUY A PEEK" GAMING METHODS AND DEVICES

CROSS-REFERENCE TO RELATED APPLICATIONS

This application claims priority to U.S. Provisional Patent Application No. 60/592,410, entitled "Draw Bingo" and filed Jul. 30, 2004.

BACKGROUND OF THE INVENTION

The present disclosure relates to wagering games and, more particularly, to gaming machines and/or gaming networks for providing wagering games.

Many wagering games involve require a player to make one or more choices after a first stage of the game which could determine the outcome of the game. Such a situation (or the time of such a situation) will sometimes be referred to herein as a "decision point." The choices must be made, at least in part, upon information that is concealed from the player at the decision point.

For example, during the first stage of playing blackjack, a player is dealt one card face down and one card face up. In this example, the concealed information is the identity of the card that was dealt face down. At the decision point, before the player knows what card was dealt face down, the player must decide whether to or not to have the dealer "hit" him or her with one or more additional cards.

Similarly, during the first stage of a poker game, a player is dealt an initial hand of cards. At the decision point, the player must decide which cards from the initial hand to keep or "hold" before knowing what "draw cards" are available to replace cards that are not held. In this example, the concealed information is the identity of one or more draw cards.

Accordingly, many players would like to obtain at least some of the concealed information at the decision point. However, under normal gaming rules, the only way to obtain this information at the decision point is by some form of cheating.

SUMMARY OF THE INVENTION

The present invention provides methods and devices for providing wagering games. A player pays an initial price to play a wagering game according to normal game rules. Game information that would normally be concealed from the player is offered for an additional price. In some implementations, the wagering game is a poker game and the game information is draw card information. The additional price may increase according to the amount of game information provided. In some implementations, a paytable percentage for the wagering game decreases according to the amount of game information provided.

Some implementations of the invention provide a gaming method. The method includes the following steps: conducting a wagering game until a decision point is reached, the decision point based in part upon game information concealed from a player; offering, for a price, to provide the player with an amount of the game information; and reducing the player's odds of winning the wagering game if the player accepts the offer.

The wagering game may be a poker game. The concealed game information may be draw card information. The player may be allowed to select draw cards according to normal rules of the poker game. Alternatively, the player may be allowed to select draw cards in any order, whether or not the order would violate normal rules of the poker game.

The price may vary according to the amount of game information provided to the player. The step of reducing the player's odds of winning may involve decreasing a paytable percentage when the player accepts the offer. However, in some implementations the paytable percentage is reduced to a percentage that is above an actual payout percentage that applies when players do not accept the offer. The player's odds of winning can decrease according to the amount of game information provided to the player. A maximum win amount may be reduced if the player accepts the offer.

Alternative implementations of the invention provide another gaming method. The method includes these steps: providing, for a first payment, a first stage of a wagering game; providing a second stage of the wagering game according to game decisions of a player made prior to the second stage, and offering, prior to the second stage, to provide first information about the second stage in exchange for a second payment.

The amount of first information may vary according to an amount of the second payment. The method may include the step of applying a first paytable percentage when a player rejects an offer to provide first information and/or applying a second paytable percentage when a player accepts an offer to provide first information.

The wagering game may be a poker game. The player may be allowed to select draw cards according to normal rules of the poker game. Alternatively, the player may be permitted to select draw cards in any order, whether or not the order would violate normal rules of the poker game. The step of offering to provide first information may involve offering to show at least one draw card and the second payment may vary according to a number of draw cards to be shown. The first information may be the identity of at least one draw card.

Other implementations of the invention provide a method of playing an electronic bingo game. The method includes the following steps: conducting an electronic bingo game involving a plurality of players to allow at least one of the plurality of players to achieve a game-winning outcome, the conducting step comprising displaying a simulation of a bingo card; displaying a hand of playing cards, each card of the hand corresponding with a corresponding area of the bingo card; allowing players to optionally select cards of the hand; offering players, for a price, the opportunity to view at least one of a plurality of draw cards; permitting players to select draw cards; displaying a pattern of the bingo card as a result of a card game; and selecting a winning card player who achieves the highest-ranking pattern.

Another method of playing an electronic bingo game is provided according to the invention. The method includes these steps: forming a plurality of bingo cards by mapping each of a plurality of numbered areas of each bingo card to corresponding playing cards; providing at least some of the plurality of bingo cards to bingo players; conducting a conventional bingo game until a player daubs a game-winning pattern of numbered areas of the player's bingo card; displaying a first hand of playing cards for each player, each card in the hand corresponding to one of the numbered areas of the player's bingo card; allowing players to optionally select cards of the hand; offering players, for a price, the opportunity to view at least one of a plurality of draw cards; permitting players to select draw cards; displaying a second hand of playing cards, the second hand including selected draw cards, if any; and paying out a prize to a player who achieves the highest-ranking second hand.

Still other methods of providing an electronic bingo game are included in the present invention. One such method includes these steps: selecting a number of balls for an electronic simulation of a ball drop; selecting a type of bingo card, the type including a number of areas and a game-winning pattern; assigning ball numbers of the ball drop to areas of bingo cards; mapping areas of the bingo card to corresponding playing cards; displaying to players a bingo card, a ball drop display, a playing card display and means for daubing; displaying a first ball drop session to players, the first ball drop session including hits that complete a game-winning pattern on at least one player's bingo card; providing the players a predetermined first time to daub hits on their bingo card; displaying a second ball drop session to players, the second ball drop session including hits that complete all players' bingo cards; providing the players a predetermined second time to daub hits on their bingo card; displaying a first hand of playing cards in the playing card display corresponding to selected hits; allowing players to select cards from their hand to hold; offering players, for a price, the opportunity to view at least one of a plurality of draw cards; allowing players who did not select all cards in their hand the opportunity to select one or more draw cards; displaying a second hand of playing cards in the playing card display corresponding to held cards and drawn cards, if any; determining a winning hand of cards; and indicating the winning hand of cards.

The foregoing methods may be implemented in various ways, e.g., via computer software and/or via hardware or firmware of devices in a gaming network. Such devices include, but are not limited to, gaming machines and network devices such as game servers.

For example, some embodiments of the invention provide a gaming network for playing an electronic bingo game. The gaming network includes a plurality of gaming machines and a game server. The game server is configured to transmit game data to the plurality of gaming machines for conducting an electronic bingo game that allows at least one of a plurality of players to achieve a game-winning outcome. The game data includes simulated bingo cards for display on the plurality of gaming machines. Each of the plurality of gaming machines is configured to do the following: display a hand of playing cards, each card of the hand corresponding with a corresponding area of the bingo card; allow players to optionally select cards of the hand; offer players, for a price, the opportunity to view at least one of a plurality of draw cards; permit players to choose draw cards; and display a pattern of the bingo card as a result of a card game. The game server is further configured to select winning card players who achieve winning patterns.

A further understanding of the nature and advantages of the present invention may be realized by reference to the remaining portions of the specification and the drawings.

DESCRIPTION OF THE PREFERRED EMBODIMENTS

Figure 1:
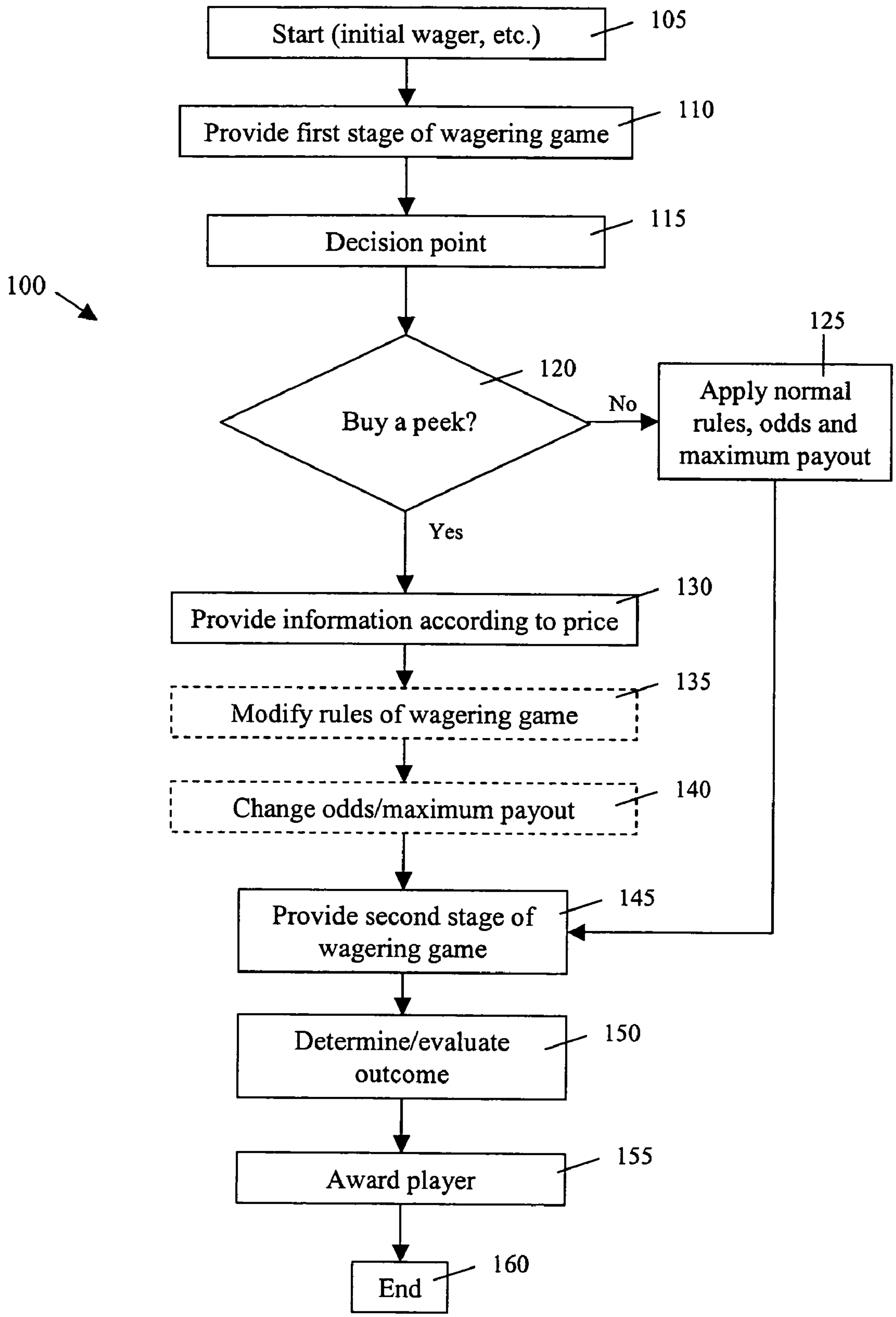
FIG. 1 is a flow chart that outlines some general methods of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

The present invention provides methods and devices for providing wagering games. Some aspects of the invention are implemented in stand-alone gaming machines or in networks that include gaming machines. In some implementations, the wagering games may be played with playing cards, etc., without the involvement of gaming machines or similar devices.

In some implementations of the invention, a player can make a first payment to play a wagering game according to normal game rules. However, during the wagering game, the player is offered the chance of determining game information that would be concealed from the player under the normal rules of the wagering game. The player may be offered this game information for a second payment. The second payment may increase according to the amount of game information provided.

Alternatively, or in addition, the player's odds of winning, the maximum possible award, etc., may be reduced in exchange for "buying a peek" at this game information. Therefore, as used herein, the phrases "buy a peek," "buying a peek" or the like will refer to obtaining game information that would be concealed from the player under the normal rules of the wagering game, whether or not a second payment is required to obtain this information. According to the implementation, the player's odds of winning and/or maximum award in a bonus and/or progressive may also be reduced in exchange for this game information. In some implementations, a paytable percentage for the wagering game decreases according to the amount of game information provided. Accordingly, the game operator (e.g., a casino or a similar gaming establishment) may offset the advantage rendered to the player resulting from the disclosure of additional game information by collecting more money from the player and/or by reducing the player's odds of winning, the maximum award, etc.

However, such changes may or may not cause any disadvantage to the player. In some instances, for example, the paytable percentage of a poker game provided on a gaming machine may be 100%, or close to 100%. Players' mistakes typically reduce the actual payout percentage to around 90%-92%. Some implementations of the invention reduce the paytable percentage of such a game to between the former actual payout percentage (the actual payout percentage that applies when players do not "buy a peek") and the former paytable percentage. For example, if the former paytable percentage was 100% and the actual payout was 90%, some such implementations of the invention reduce the paytable percentage for players who "buy a peek" to between 90% and 100%. In some such circumstances, the player may actually have a better chance of winning, because a player who is aware of the additional game information is less likely to make mistakes. However, if the player has a better chance of winning after receiving the game information, the player should preferably pay a price for the game information and/or the maximum award/payout should be reduced. Alternatively, or in addition, if a player "buys a peek," the player's odds of winning may be reduced.

In some implementations, the wagering game is a poker game and the game information is draw card information. For example a player may be offered the chance to view the first draw card for a first price, the first two draw cards for a second price, etc.

In some implementations, the normal rules of the wagering game may be altered to take into account the purchased information. For example, in some implementations wherein the wagering game is a poker game, the normal rules for drawing cards are altered. In some such implementations, a player may choose draw cards out of sequence. For example, a player may pay to see two draw cards and decide to pick the only the second draw card. The paytable percentage and/or price is preferably altered to reflects any rule changes that increase the players' odds of winning.

FIG. 1 is a flow chart that provides an overview of some implementations of the invention. In some implementations, the steps of method 100 may be performed by a properly configured gaming machine. In some such implementations, the gaming machine is a "stand-alone" gaming machine, whereas in other implementations the gaming machine is acting in part under the control of data and/or commands from a network device such as a game server. In some such implementations, a game server performs at least some of the steps of method 100. Those of skill in the art will appreciate that the steps of method 100 need not be performed (and in some implementations are not performed) in the order shown. Moreover, some implementations of method 100 may include more or fewer steps than those shown in FIG. 1. The foregoing comments regarding method 100 apply to all methods illustrated and described herein.

In step 105, the preliminary steps for beginning a wagering game are performed. For example, the player will generally make a first payment in the form of a wager. If the game is conducted on a gaming machine, the player may insert a payment document into a bill acceptor and may insert a player tracking card into a player tracking card reader.

In step 110, the first stage of the wagering game is provided. If the game is a card game, the first stage may involve dealing an initial hand of cards. Some implementations of the invention are based on a Class II game that includes a display for simulating a Class III game. For example, some implementations of the invention provide a Class II bingo game that has a display of poker cards. U.S. patent application Ser. No. 10/925,710, entitled "Draw Bingo" and filed Aug. 24, 2004 provides relevant methods and devices and is hereby incorporated by reference for all purposes. For draw bingo games, step 110 involves at least a first ball drop and the display of an initial poker hand that corresponds with "hits" on a bingo card.

Step 115 is a decision point. At this time of the game, the player is required to make one or more decisions that will affect the outcome of the game. For example, in a blackjack game, the player may need to decide whether to have the dealer "hit" him or her with one or more cards or just stand pat. In a poker or a draw bingo game, the player needs to decide which cards to hold.

In step 120, before the player has made the decisions required by the decision point, the player is offered the opportunity to "buy a peek" at game information upon which the decision will be made. If the player does not wish to obtain the game information, the normal rules of the game (and the normal odds of winning) will be applied (step 125).

In this example, the player is playing a wagering game on a gaming machine. The player decides to "buy a peek" in step 120. In this example, the player is required to pay an additional amount of money in exchange for gaming information. Accordingly, the player is required to provide a second payment, e.g., by inserting additional money into the gaming machine, by authorizing a debit of the player's gaming account, or by otherwise providing a monetary credit. U.S. patent application Ser. No. 10/925,710 entitled "Methods and Devices for Gaming Account Management" and filed on Aug. 25, 2004 describes relevant methods and devices and is hereby incorporated by reference for all purposes.

In this example, the player is provided game information according to the amount of the second payment in step 130. The player may use this game information in making choices that will determine the outcome of the wagering game. In optional step 135, the normal rules of the wagering game are altered to allow the player more options when using the purchased game information. Some examples of rule modification will be discussed below.

In step 140, the player's odds of winning and/or maximum possible win are preferably altered to reflect the gaming information provided in step 130 and/or any rule modifications that would increase the players' odds of winning. In this example, the player is playing a wagering game on a gaming machine and a paytable percentage is reduced in step 140.

Methods of generating paytables for skill games are well known. One method is described here. Paytables are generated to match a desired paytable percentage. The paytable percentage is the percentage of money taken in which is expected to be returned to the player. Other criteria may be used in developing a paytable, such as the size and frequency of awards, but these are secondary to the paytable percentage. Since gambling games are statistical in nature and skill games are affected by player choices, the paytable percentage does not reflect a guaranteed percentage returned to the players. Rather, it is an expected value, which the machine is anticipated to approach over a long period of use. The paytable percentage is generated by assuming a constant wager amount, examining each possible game outcome for that wager amount, and adding its win amount to a total. Thus, the formula for paytable percentage can be expressed as:

Paytable Percentage=100*Sum of win amounts for all possible outcomes, with wager W/(number of games*wager W)

In some games, one outcome may be more likely than another outcome. In this case, the formula may resemble this:

Paytable percentage contribution=100*Win amount for outcome O, with wager W*Probability of outcome O/Wager W.

Paytable percentage=100*Sum of paytable percentage contributions for all possible outcomes.

In games with no element of player choice, the method described above will suffice. For games involving player choice, the effect that the choice may have on the win amount should be accounted for. In this case, it is assumed that the player is playing according to an optimal strategy—a strategy that will produce the greatest return. Thus, the win amount for a specific game is based on player choices that yield the greatest outcome. The paytable percentage represents the maximum return that a player may achieve. Since the win amount for a specific outcome is no longer guaranteed, but is dependent on player choice and possibly other random factors, the win amount is replaced with an expected value. The expected value is the amount, on the average, that is expected to be returned to the player for a specific outcome, given that the player uses the optimal strategy for making choices. The equation may then resemble the following:

Paytable Percentage=100*Sum of expected values for all possible outcomes, with wager W/(number of games*wager W)

To demonstrate how player choice is accounted for in a game of skill, a sample poker game will be used. In standard poker games, a player is dealt 5 cards out of a deck of 52 cards. The player chooses which cards to hold or discard and draws new cards to replace those discarded. The final hand is evaluated according to the paytable and the player is paid accordingly. Assume that the paytable pays according to the following, with a wager of 1 credit:

| Outcome | Win amount |
|---|---|
| Royal Flush | 250 credits |
| Straight Flush | 50 credits |
| Four of a Kind | 25 credits |
| Full House | 7 credits |
| Flush | 5 credits |
| Straight | 4 credits |
| Three of a Kind | 3 credits |
| Two Pair | 2 credits |
| Jacks or Better | 1 credits |
| Loss | 0 credits |

Each unique hand of 5 cards dealt should be considered. In a standard poker game there are Choose (52, 5)=52!/(47!*5!)=2,598,960 possible initial hands. This represents the number of ways to choose 5 cards out of a deck of 52, where the order in which the cards are selected doesn't matter. For each unique hand of 5 cards dealt, the optimal player strategy should be determined and applied. A sample dealt hand will now be considered, consisting of the Ten of Spades, Jack of Spades, Queen of Spades, King of Spades and Ace of Hearts will be considered. The player has the choice to hold or discard each card, resulting in 2^5=32 possible ways to hold the cards. Each should be considered individually.

First, the possibility that the player holds all 5 cards is considered. Since there are no cards to draw, the held cards entirely make up the final hand, and there is only one possible final hand. As shown below, this final hand is the only contributor to the expected value for this player choice.

| | |
|---|---|
| Cards dealt | Ten of Spades<br>Jack of Spades<br>Queen of Spades<br>King of Spades<br>Ace of Hearts |
| Cards held (Player choice) | Ten of Spades<br>Jack of Spades<br>Queen of Spades<br>King of Spades<br>Ace of Hearts |

| Possible Outcomes | Ways to get outcome | Pay For outcome | Product of Ways * Pay |
|---|---|---|---|
| Royal Flush | 0 | 250 credits | 0 credits |
| Straight Flush | 0 | 50 credits | 0 credits |
| Four of a Kind | 0 | 25 credits | 0 credits |
| Full House | 0 | 7 credits | 0 credits |
| Flush | 0 | 5 credits | 0 credits |
| Straight | 1 | 4 credits | 4 credits |
| Three of a Kind | 0 | 3 credits | 0 credits |
| Two Pair | 0 | 2 credits | 0 credits |
| Jacks or Better | 0 | 1 credits | 0 credits |
| Loss | 0 | 0 credits | 0 credits |
| Total | 1 | | 4 credits |
| Expected Value = Total of Ways * Pays/Total Ways | | 4 credits/1 = 4 credits | |

Thus, if the player holds all 5 cards, he can expect to get 4 credits for a Straight. Since there is only one possible outcome, this expectation is guaranteed.

Another possibility is that the player discards the Ace of Hearts and holds the Ten of Spades, Jack of Spades, Queen of Spades and King of Spades. Since the player must draw one card out of the remaining 47 cards, there are 47 possible outcomes, all equally likely. There is one way for the player to get a Royal Flush, by drawing the Ace of Spades. There is one way for the player to get a Straight Flush, by drawing the Nine of Spades. There are 7 ways for the player to get a Flush, by drawing the Two, Three, Four, Five, Six, Seven or Eight of Spaces. There are 5 ways for the player to get a Straight, by drawing the Nine of Diamonds, Nine of Hearts, Nine of Clubs, Ace of Diamonds or Ace of Clubs. There are 9 ways for the player to get Jacks or Better, by drawing a Jack, Queen or King of Diamonds, Hearts or Clubs. The remaining 24 possible cards drawn result in losses.

| | |
|---|---|
| Cards dealt | Ten of Spades<br>Jack of Spades<br>Queen of Spades<br>King of Spades<br>Ace of Hearts |
| Cards held (Player choice) | Ten of Spades<br>Jack of Spades<br>Queen of Spades<br>King of Spades |

| Possible Outcomes | Ways to get outcome | Pay For outcome | Product of Ways * Pay |
|---|---|---|---|
| Royal Flush | 1 | 250 credits | 250 credits |
| Straight Flush | 1 | 50 credits | 50 credits |
| Four of a Kind | 0 | 25 credits | 0 credits |
| Full House | 0 | 7 credits | 0 credits |
| Flush | 7 | 5 credits | 35 credits |
| Straight | 5 | 4 credits | 20 credits |
| Three of a Kind | 0 | 3 credits | 0 credits |
| Two Pair | 0 | 2 credits | 0 credits |

-continued

| | | | |
|---|---|---|---|
| Jacks or Better | 9 | 1 credits | 9 credits |
| Loss | 24 | 0 credits | 0 credits |
| Total | 47 | | 364 credits |
| Expected Value = Total of Ways * Pays/Total Ways | | 364 credits/47 = 7.745 | |

Thus if the player discards the Ace of Hearts and holds the other 4 cards, he can expect to get an average of 7.74 credits. Since the card drawn is randomly determined, this expected value is not guaranteed. In reality the player could lose or could win as much as 250 credits. The expected value is an average of all possible outcomes.

By comparing the expected values on the two charts above, it can be seen that discarding the Ace of Hearts is a more optimal strategy than holding all cards, since it results in a much higher expected value. Similar calculations can be performed on the remaining 30 ways to hold the initial 5 cards dealt, resulting in the following expected values. For brevity, Ten, Jack, Queen, King and Ace are represented as T, J, Q, K and A. Hearts and Spades are represented as H and S.

| Cards held | Expected Value |
|---|---|
| None | 0.286 credits |
| TS | 0.260 credits |
| JS | 0.422 credits |
| TS JS | 0.384 credits |
| QS | 0.418 credits |
| TS QS | 0.366 credits |
| JS QS | 0.500 credits |
| TS JS QS | 0.633 credits |
| KS | 0.415 credits |
| TS KS | 0.354 credits |
| JS KS | 0.488 credits |
| TS JS KS | 0.536 credits |
| QS KS | 0.488 credits |
| TS QS KS | 0.536 credits |
| JS QS KS | 0.638 credits |
| TS JS QS KS | 7.745 credits |
| AH | 0.430 credits |
| TS AH | 0.319 credits |
| JS AH | 0.454 credits |
| TS JS AH | 0.325 credits |
| QS AH | 0.454 credits |
| TS QS AH | 0.325 credits |
| JS QS AH | 0.427 credits |
| TS JS QS AH | 0.447 credits |
| KS AH | 0.454 credits |
| TS KS AH | 0.325 credits |
| JS KS AH | 0.427 credits |
| TS JS KS AH | 0.447 credits |
| QS KS AH | 0.427 credits |
| TS QS KS AH | 0.447 credits |
| JS QS KS AH | 0.511 credits |
| TS JS QS KS AH | 4.000 credits |

Of all possible choices, holding the Ten, Jack, Queen and King of Hearts and discarding the Ace of Spades produces the greatest expected value. Thus, that is the optimal player strategy for this initial hand of cards and its expected value is used as the maximum expected value for this initial hand of cards.

This procedure is repeated for each possible initial hand of cards. The expected values are then applied to the above paytable percentage equations to produce the paytable percentage. If the paytable percentage is not within the desired range, or if other paytable criteria, such as the size and frequency of awards, are unsatisfactory, the paytable may be altered and re-evaluated. The win amounts for the various win types may be increased or decreased as desired. It is also possible to vary the probabilities of each win type by adding or removing cards such as a joker, or by designated certain cards as wild cards.

Many variations to this procedure are encompassed by the present invention. For example, in the above sample hand, one can replace all the Spade cards with Diamond cards of the same face value without changing the optimal strategy or the expected value. Thus, one can avoid performing redundant calculations if only the suits are different from previously calculated initial hands. As another example, if the win amount for all outcomes is multiplied by the amount wagered, the paytable percentage is the same for all wagers and it is not necessary to recalculate the paytable percentage for every possible wager amount. Such paytable generating methods can be applied to all gambling games and are not limited to poker games.

In a “Buy a Peek” poker game according to some implementations of the invention, knowing the identity of one or more draw cards will make determining the player’s optimal strategy simpler, by reducing the number of possible outcomes. For example, given the same initial hand as above, if the player knows that the next card to be drawn is a King of Hearts, the player can weigh the choice of holding all 5 cards for a Straight, worth 4 credits, against discarding the Ace of Hearts and drawing the King of Hearts for jacks or better, worth 1 credit. This also increases the number of outcomes that should be considered, since the initial deal can be viewed to consist of 6 cards, instead of 5. The initial deal would be: Ten of Spades, Jack of Spades, Queen of Spades, King of Spades and Ace of Hearts with a King of Hearts to be drawn first. This general method can be extended to all “Buy a Peek” variations.

In step 145, a second stage of the wagering game is provided, according to choices made by the player. If the game is a card game the second stage of the wagering game may involve presenting a final hand of cards. In this example, the wagering game is provided on a gaming machine, so the gaming machine provides a display of the second stage of the wagering game in step 145. In step 150, the wagering game outcome is evaluated in view of the changes to the player’s odds of winning, maximum win, etc., according to the implementation. As previously noted, these factors are altered in some implementations according to whether the player decided to “buy a peek” in step 120. In step 155, the player is awarded according to the outcome. In most implementations, the most common award is a zero credit award. In step 160, the process ends.

Figure 2:
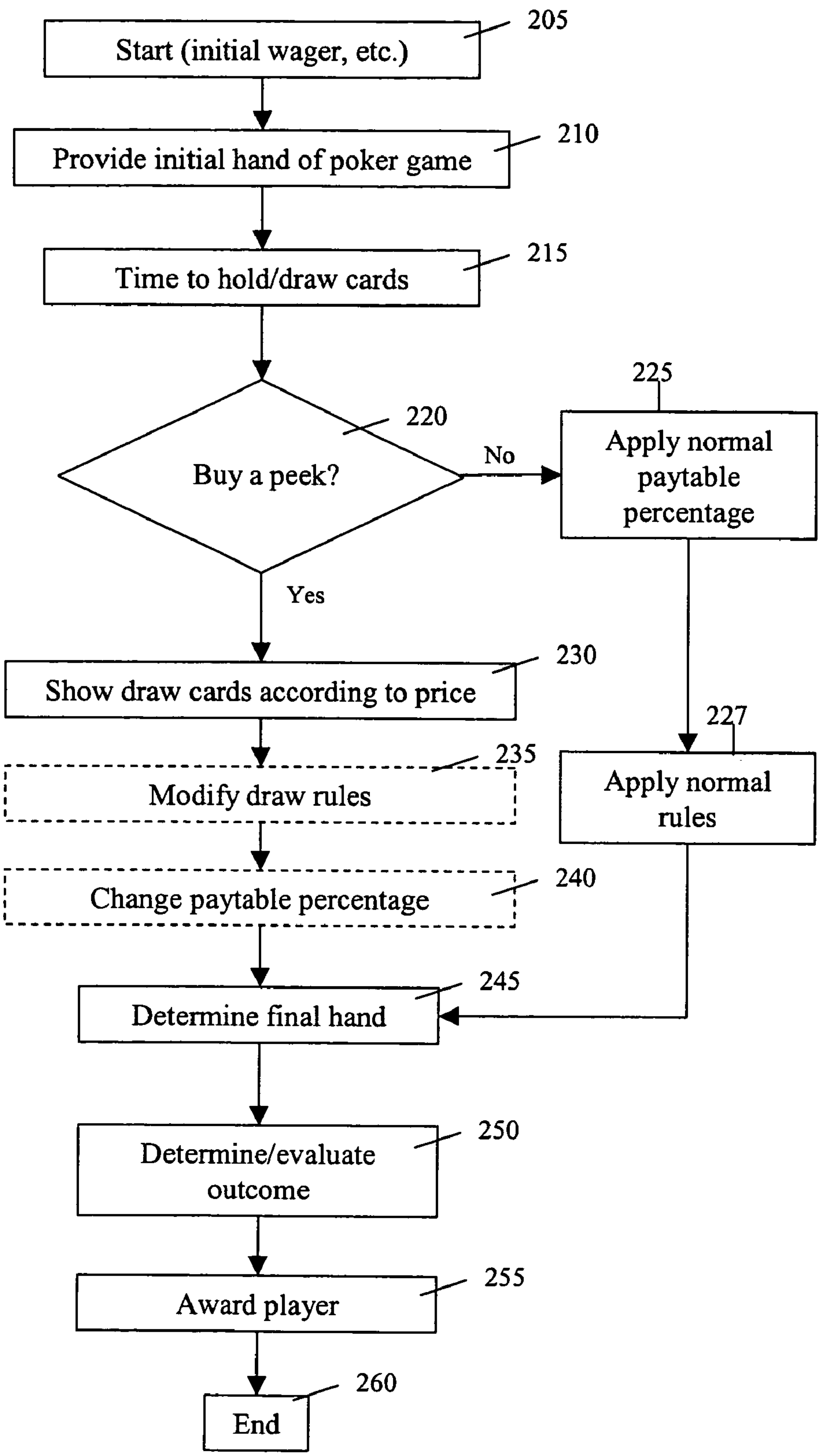
FIG. 2 is a flow chart that outlines more specific methods of the present invention.

FIG. 2 is a flow chart that outlines some methods for providing a video poker game or similar game (e.g., a draw bingo game) according to the present invention. In step 205, the preliminary steps for beginning the poker game are performed. In this example the game is conducted on a gaming machine, so the player makes a first payment in the form of a wager. The player may insert a payment document into a bill acceptor, insert coins into a slot, cause a gaming account to be debited, etc. In addition, the player may take other actions, such as inserting a player tracking card into a player tracking card reader.

In step 210, the first stage of the game is provided. Here, the first stage includes providing a display that depicts an initial hand of cards. In this example, the initial hand contains 5 cards, but other implementations provide other numbers of cards (e.g., 7). For draw bingo games, step 210 involves at least one ball drop and the display of an initial poker hand that corresponds with “hits” on a bingo card.

Step 215 is a decision point. At this time, the player needs to decide which cards to hold. In step 220, before the player has made the decisions required by the decision point, the player is offered the opportunity to "buy a peek" at game information, which in this example is information regarding draw cards. In some implementations, the player is only offered the opportunity to "buy a peek" at one draw card. In alternative implementations, the player is offered the opportunity to "buy a peek" at multiple draw cards, preferably for an increase in price (and/or a reduction in odds and/or maximum payout) commensurate with the advantage that the player will obtain as a result of viewing the additional draw cards. In some such implementations, the player will be offered a peek at a number of draw cards that less than or equal to the number of cards in the initial hand. In alternative implementations, in which the normal poker draw rules are modified, a player may be offered the opportunity to "buy a peek" at even more draw cards than are in the initial hand (e.g., 10 draw cards when the initial hand has 5 cards).

If the player does not wish to view any draw cards, the normal rules of the game will be applied (step 225). The normal odds of winning, the normal maximum award/payout, etc., will also be applied (step 227).

However, in this example the player decides to "buy a peek" in step 220. In this example, the player is required to pay an additional amount of money in exchange for draw card information. Accordingly, the player is required to provide a second payment, e.g., by inserting additional money into the gaming machine, by authorizing a debit of the player's gaming account, or by otherwise providing a monetary credit. Here, the initial hand contains 5 cards and the player is offered a chance to view from 1 to 5 draw cards. In this example, the price increases according to a linear scale: the price for viewing 2 draw cards is twice that for viewing 1 draw card, the price for viewing 3 draw cards is three times that for viewing 1 draw card, etc.

Here, the player decides to view 2 draw cards and is charged accordingly. In step 230, the display of the gaming machine shows the player images corresponding to the next two draw cards. In optional step 235, the normal rules of drawing cards are altered to allow the player more options when using the purchased game information. Some examples of such a rule modification will be discussed below with reference to FIGS. 3 through 7.

In optional step 240, the player's odds of winning and/or maximum possible win are altered to reflect the gaming information provided in step 230 and/or any rule modifications that would increase the players' odds of winning. In this example, the paytable percentage of the gaming machine is reduced in step 240.

In step 245, a second stage of the wagering game is provided, according to choices made by the player. In this example, the second stage involves presenting a final hand of cards in accordance with the player's decision to hold 4 of the 5 cards from the initial hand and to select one draw card. In this example, the player's final hand includes a pair of sevens and a pair of tens.

In step 250, the final hand is evaluated in view of the changes to the player's odds of winning, maximum win, etc., according to the implementation. As whether the player decided to "buy a peek" in step 220. In step 255, the player is awarded according to the determination of step 250. In this example, the player receives a zero credit award. In step 260, the process ends.

Figure 3:
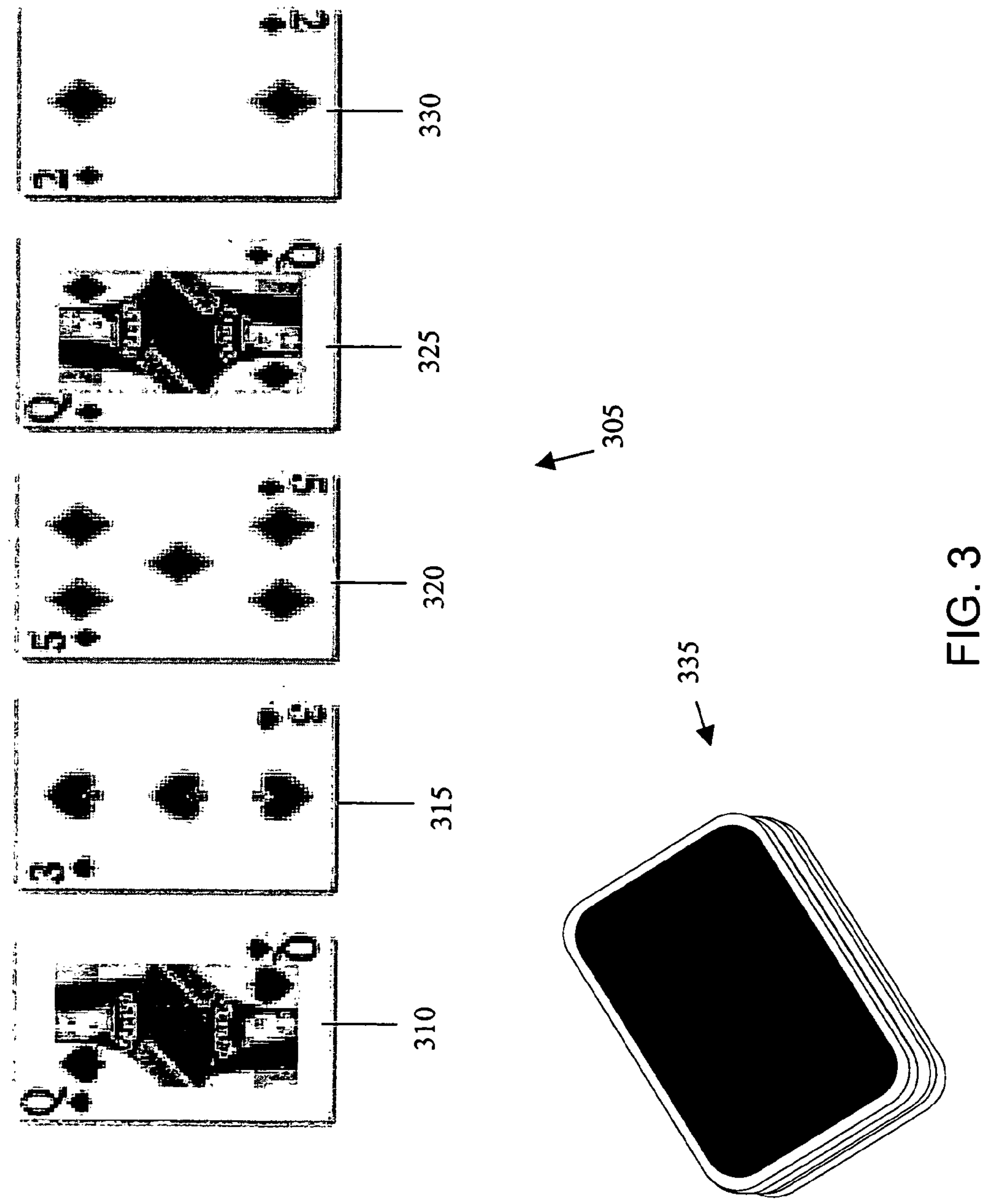
FIG. 3 illustrates a display after a first stage of a wagering game according to some implementations of the invention.

An example of modifying the rules of the underlying wagering game according to some implementations of the invention will now be described with reference to FIGS. 3 through 7, which represent displays of a gaming machine at various times. FIG. 3 illustrates initial hand 305, which includes Queen of Spades 310, Three of Spades 315, Five of Diamonds 320, Queen of Diamonds 325 and Two of Diamonds 330. Moreover, FIG. 3 illustrates deck 335, from which cards will be drawn.

Figure 4:
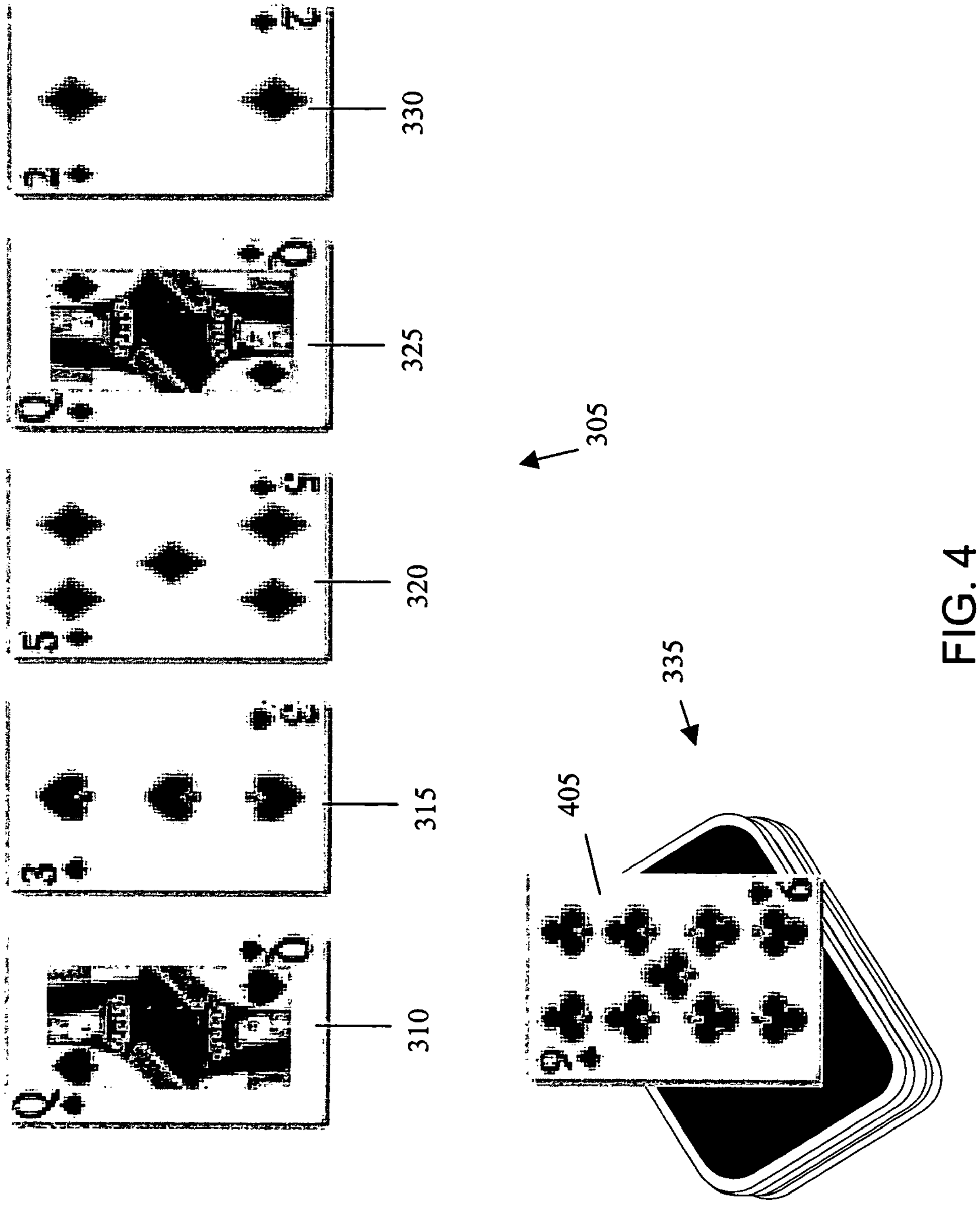
FIG. 4 illustrates a display after a player has bought a first peek according to some implementations of the invention.
Figure 5:
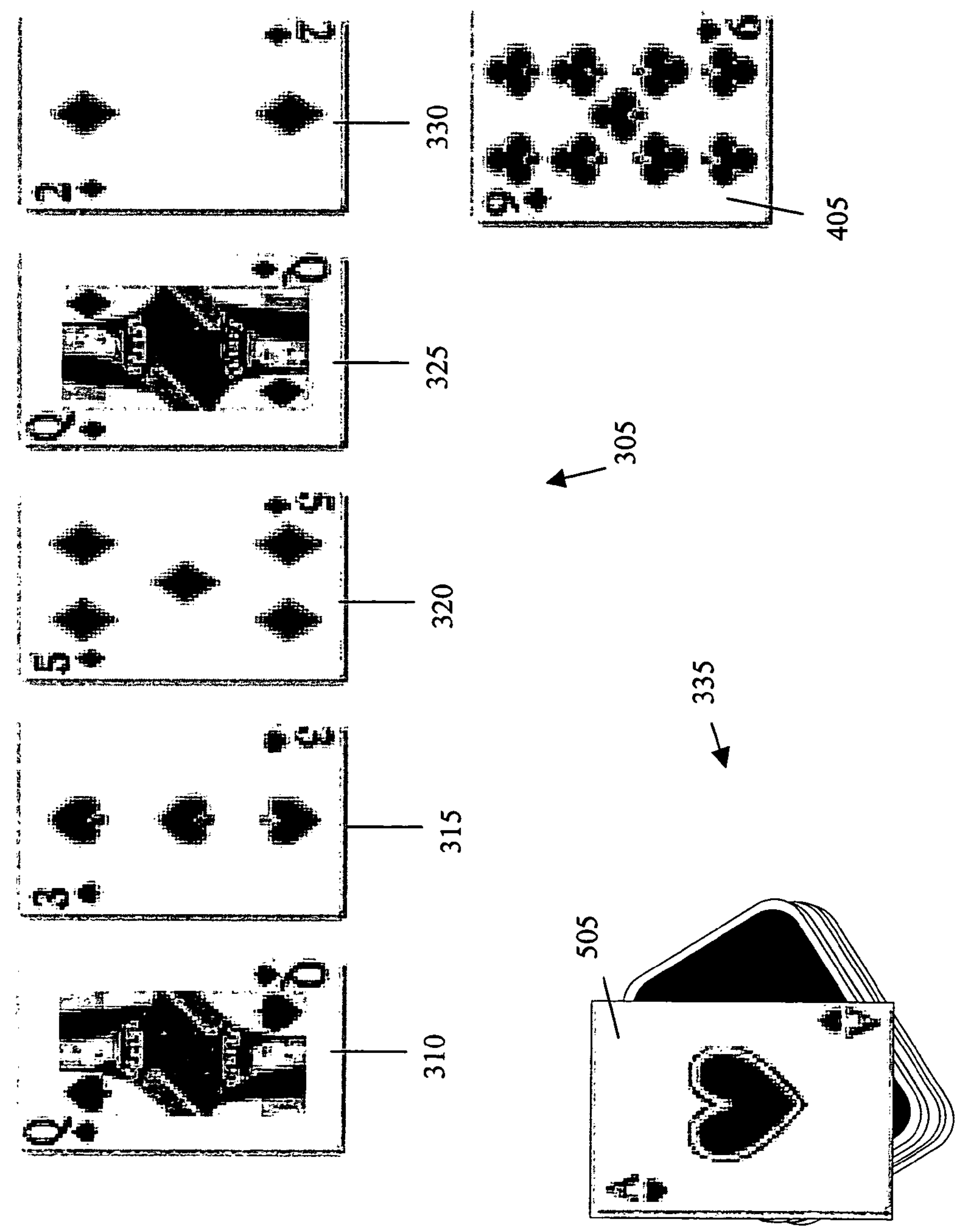
FIG. 5 illustrates a display after a player has bought a second peek according to some implementations of the invention.
Figure 6:
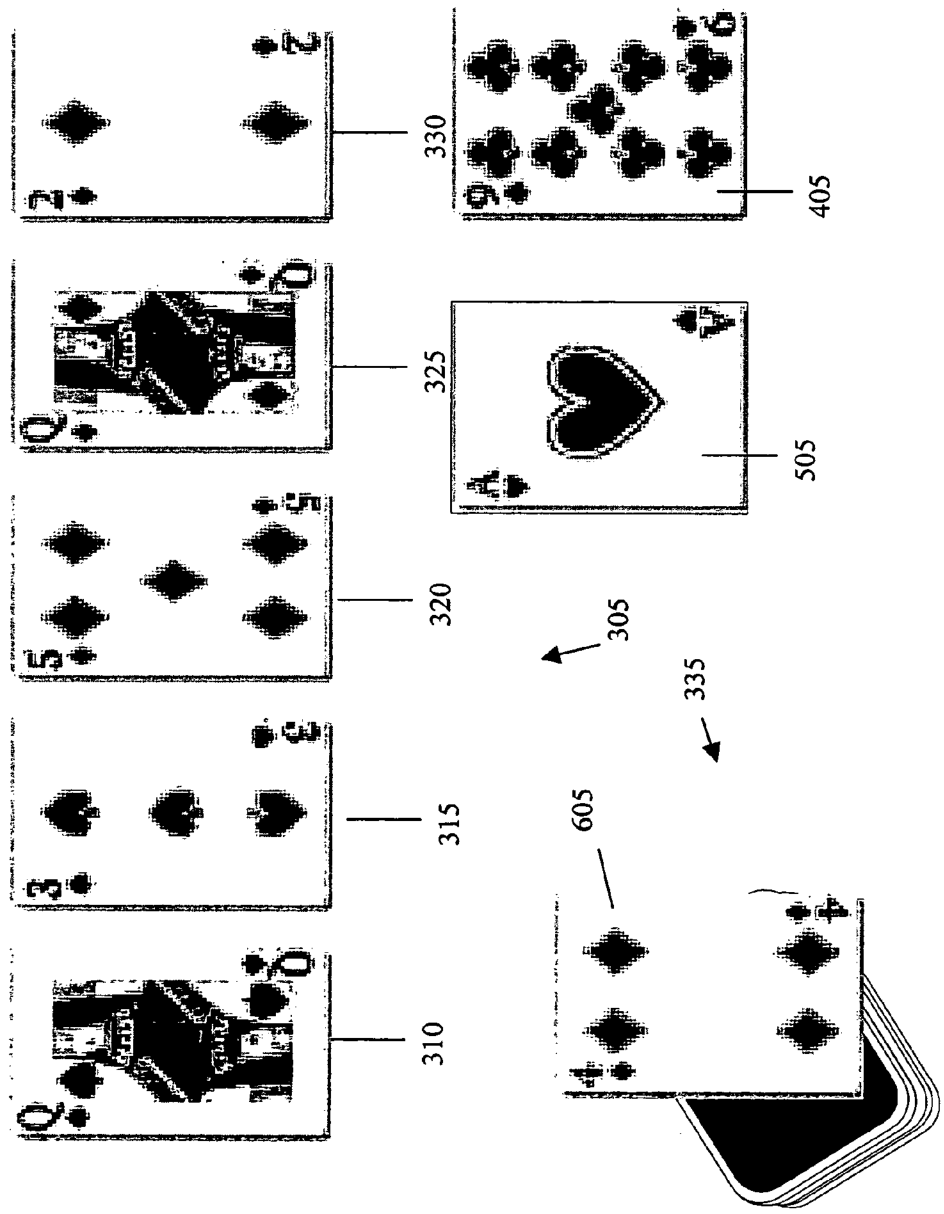
FIG. 6 illustrates a display after a player has bought a third peek according to some implementations of the invention.
Figure 7:
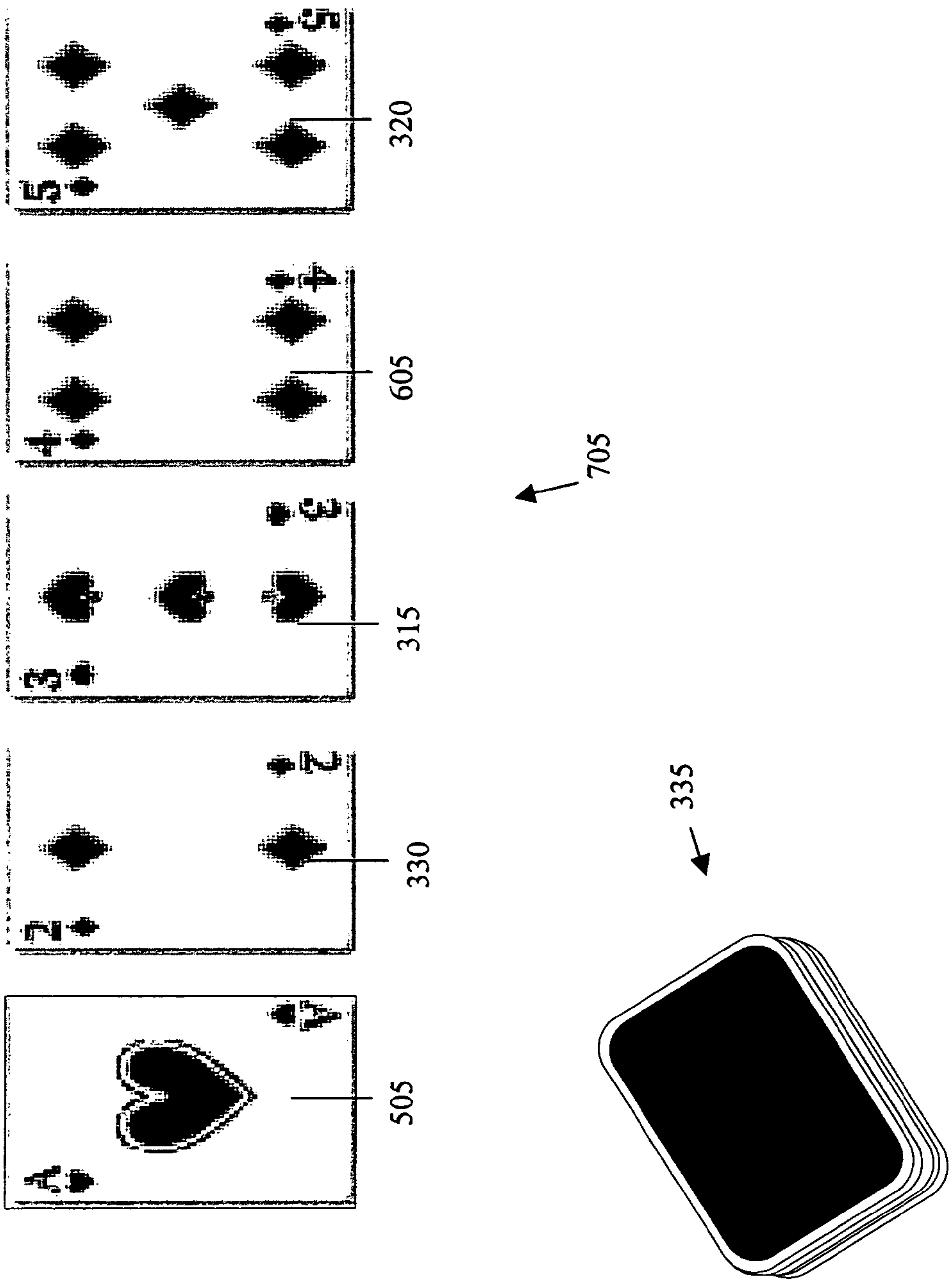
FIG. 7 illustrates a display of a final poker hand according to some implementations of the invention.

In this example, the player is offered the opportunity to view up to 5 draw cards. The player does not need to decide in advance how many draw cards to view. Accordingly, as shown in FIG. 4, the player first chooses to buy a peek at a single draw card, which is Nine of Clubs 405 in this example. This is not a helpful draw card for initial hand 305, so the player decides to buy a peek at the next draw card. As shown in FIG. 5, the next card is Ace of Hearts 505. Ace of Hearts 505 could be useful in forming a Straight, if the player were not also required to draw Nine of Clubs 405. However, the player would still need another draw card to form the Straight, so the player decides to buy a peek at the next draw card. As shown in FIG. 6, the next draw card is Four of Diamonds 605.

In this implementation, the player is not obligated to select any of the draw cards and may choose them without regard to the normal rules of poker. Therefore, the player selects Ace of Hearts 505 and Four of Diamonds 605 to form a Straight in final hand 705 (see FIG. 7). If the player had chosen not to buy a peek at any cards, the player could quite rationally have decided to hold Queen of Spades 310 and Queen of Diamonds 325 and to discard Three of Spades 315, Five of Diamonds 320 and Two of Diamonds 330. Having a superior final hand 705 will generally increase player satisfaction and excitement. However, depending on the implementation, the player may or may not receive a financial gain as a result of his choices: the cost of buying 3 draw cards and the reduced paytable percentage will, in some implementations, more than offset the payout to the player.

Figure 8:
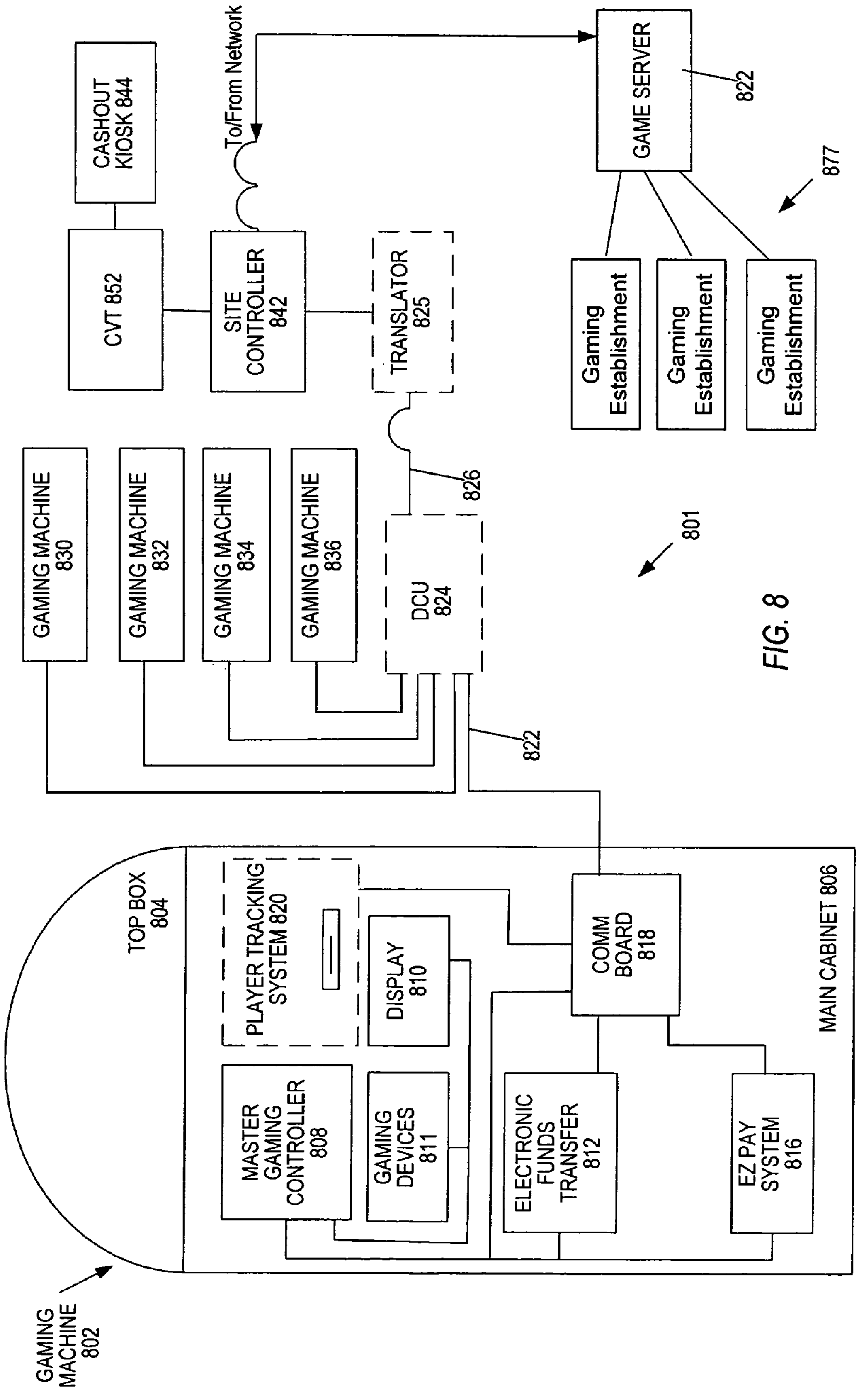
FIG. 8 is a block diagram of a number of gaming machines in a gaming network that may be configured to implement some methods of the present invention.

One example of a gaming machine network that may be used to implement methods of the invention is depicted in FIG. 8. Gaming establishment 801 could be any sort of gaming establishment, such as a casino, a card room, an airport, a store, etc. However, some methods and devices of the present invention are intended for gaming networks (which may be in multiple gaming establishments) in which there are a sufficient number of Class II gaming machines for bingo play. In this example, gaming network 877 includes more than one gaming establishment, all of which are networked to game server 822.

Here, gaming machine 802, and the other gaming machines 830, 832, 834, and 836, include a main cabinet 806 and a top box 804. The main cabinet 806 houses the main gaming elements and can also house peripheral systems, such as those that utilize dedicated gaming networks. The top box 804 may also be used to house these peripheral systems.

The master gaming controller 808 controls the game play on the gaming machine 802 according to instructions and/or game data from game server 822 and receives or sends data to various input/output devices 811 on the gaming machine 802. Details of exemplary systems for using a game server to control a network of gaming machines to implement bingo games are described in U.S. patent application Ser. No. 60/503,161, filed Sep. 15, 2003 and entitled "Gaming Network with Multi-Player Bingo Game." This application is hereby incorporated by reference for all purposes. The master gaming controller 808 may also communicate with a display 810.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 808 may also communicate with EFT system 812, EZPay™ system 816 (a proprietary cashless ticketing system of the present assignee), and player tracking system 820. The systems of the gaming machine 802 communicate the data onto the network 822 via a communication board 818.

It will be appreciated by those of skill in the art that the present invention could be implemented on a network with more or fewer elements than are depicted in FIG. 8. For example, player tracking system 820 is not a necessary feature of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment.

Moreover, DCU 824 and translator 825 are not required for all gaming establishments 801. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems should be considered.

A network device that links a gaming establishment with another gaming establishment and/or a central system will sometimes be referred to herein as a "site controller." Here, site controller 842 provides this function for gaming establishment 801. Site controller 842 is connected to a central system and/or other gaming establishments via one or more networks, which may be public or private networks. Among other things, site controller 842 communicates with game server 822 to obtain game data, such as ball drop data, bingo card data, etc.

In the present illustration, gaming machines 802, 830, 832, 834 and 836 are connected to a dedicated gaming network 822. In general, the DCU 824 functions as an intermediary between the different gaming machines on the network 822 and the site controller 842. In general, the DCU 824 receives data transmitted from the gaming machines and sends the data to the site controller 842 over a transmission path 826. In some instances, when the hardware interface used by the gaming machine is not compatible with site controller 842, a translator 825 may be used to convert serial data from the DCU 824 to a format accepted by site controller 842. The translator may provide this conversion service to a plurality of DCUs.

Further, in some dedicated gaming networks, the DCU 824 can receive data transmitted from site controller 842 for communication to the gaming machines on the gaming network. The received data may be, for example, communicated synchronously to the gaming machines on the gaming network.

Here, CVT 852 provides cashless and cashout gaming services to the gaming machines in gaming establishment 801. Broadly speaking, CVT 852 authorizes and validates cashless gaming machine instruments (also referred to herein as "tickets" or "vouchers"), including but not limited to tickets for causing a gaming machine to display a game result and cashout tickets. Moreover, CVT 852 authorizes the exchange of a cashout ticket for cash. These processes will be described in detail below. In one example, when a player attempts to redeem a cashout ticket for cash at cashout kiosk 844, cashout kiosk 844 reads validation data from the cashout ticket and transmits the validation data to CVT 852 for validation. The tickets may be printed by gaming machines, by cashout kiosk 844, by a stand-alone printer, by CVT 852, etc. Some gaming establishments will not have a cashout kiosk 844. Instead, a cashout ticket could be redeemed for cash by a cashier (e.g. of a convenience store), by a gaming machine or by a specially configured CVT.

Figure 9:
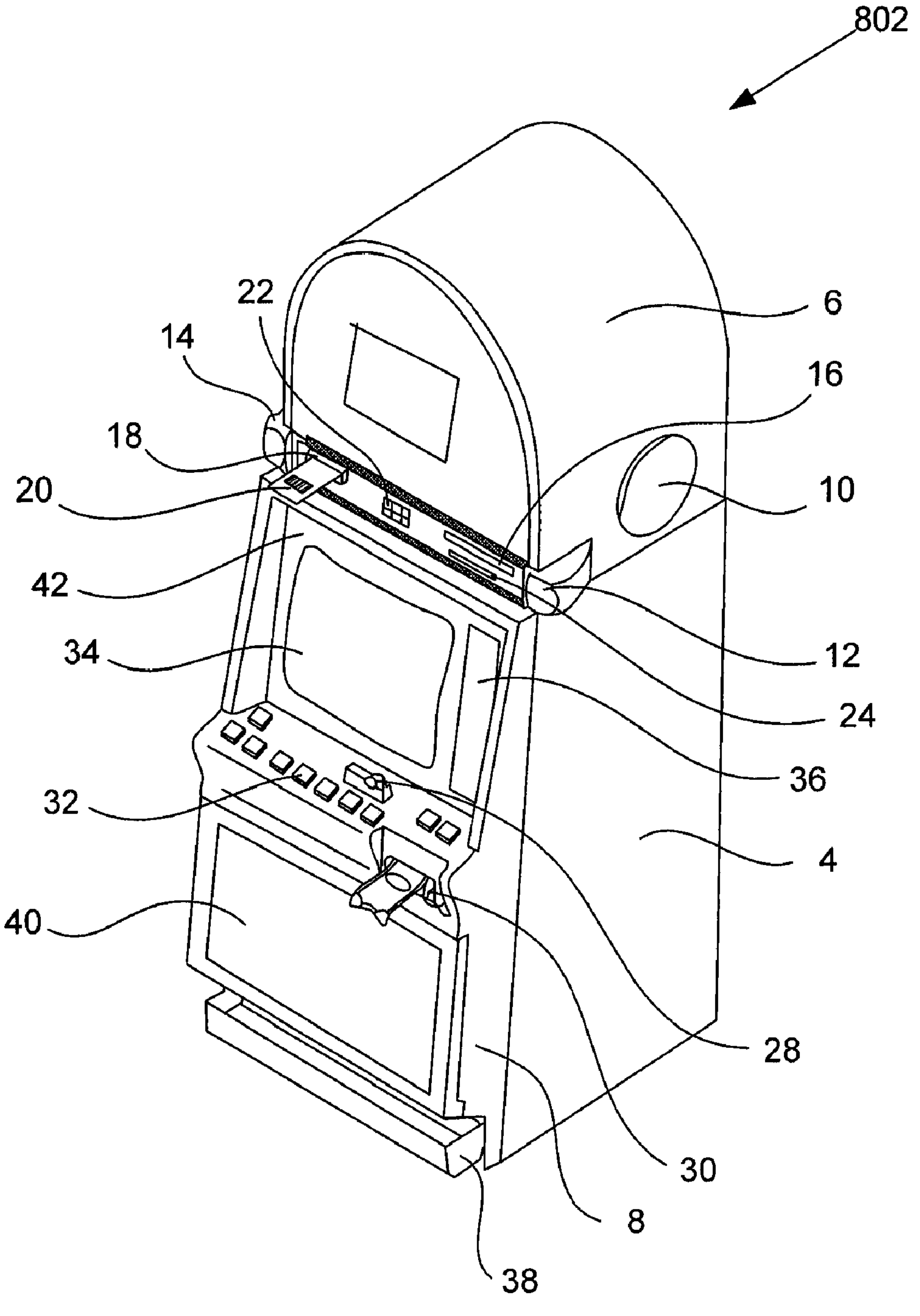
FIG. 9 illustrates an exemplary gaming machine that may be configured to implement some methods of the present invention.

Turning to FIG. 9, more details of gaming machine 802 are described. Machine 802 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 802. The devices are controlled by circuitry housed inside the main cabinet 4 of the machine 802.

The gaming machine 802 includes a top box 6, which sits on top of the main cabinet 4. The top box 6 houses a number of devices, which may be used to add features to a game being played on the gaming machine 802, including speakers 10, 12, 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 for display various light patterns used to convey gaming information. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 802 is but one example from a wide range of gaming machine designs on which the present invention may be implemented. For example, not all suitable gaming machines have top boxes or player tracking features. Further, some gaming machines have two or more game displays—mechanical and/or video. Some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present can be deployed on most gaming machines now available or hereafter developed. Moreover, some aspects of the invention may be implemented on devices which lack some of the features of the gaming machines described herein, e.g., workstation, desktop computer, a portable computing device such as a personal digital assistant or similar handheld device, a cellular telephone, etc. U.S. patent application Ser. No. 09/967,326, filed Sep. 28, 2001 and entitled "Wireless Game Player," is hereby incorporated by reference for all purposes.

Returning to the example of FIG. 9, when a user wishes to play the gaming machine 802, he or she inserts cash through the coin acceptor 28 or bill validator 30. In addition, the player may use a cashless instrument of some type to register credits on the gaming machine 802. For example, the bill validator 30 may accept a printed ticket voucher, including 20, as an indicium of credit. As another example, the card reader 24 may accept a debit card or a smart card containing cash or credit information that may be used to register credits on the gaming machine.

During the course of a game, a player may be required to make a number of decisions. For example, a player may vary his or her wager on a particular game, select a prize for a particular game, or make game decisions regarding gaming criteria that affect the outcome of a particular game (e.g., which cards to hold). The player may make these choices using the player-input switches 32, the video display screen 34 or using some other hardware and/or software that enables a player to input information into the gaming machine (e.g. a GUI displayed on display 16).

During certain game functions and events, the gaming machine 802 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 802, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 802. In some embodiments, these tickets may be used by a game player to obtain game services.

IGT gaming machines are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator of a gaming machine from manipulating hardware and software in a manner that gives them an unfair and some cases an illegal advantage. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player's wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. As noted above, some preferred embodiments of the present invention include parallel, digital interfaces for high-speed data transfer. However, even the serial devices may have electrical interface requirements that differ from the "standard" EIA RS232 serial interfaces provided by general-purpose computers. These interfaces may include EIA RS485, EIA RS422, Fiber Optic Serial, Optically Coupled Serial Interfaces, current loop style serial interfaces, etc. In addition, to conserve serial interfaces internally in the slot machine, serial devices may be connected in a shared, daisy-chain fashion where multiple peripheral devices are connected to a single serial channel.

IGT Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the trusted memory device contents in a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Gaming machines used for Class III games generally include software and/or hardware for generating random numbers. However, gaming machines used for Class II games may or may not have RNG capabilities. In some machines used for Class II games, RNG capability may be disabled.

Figure 10:
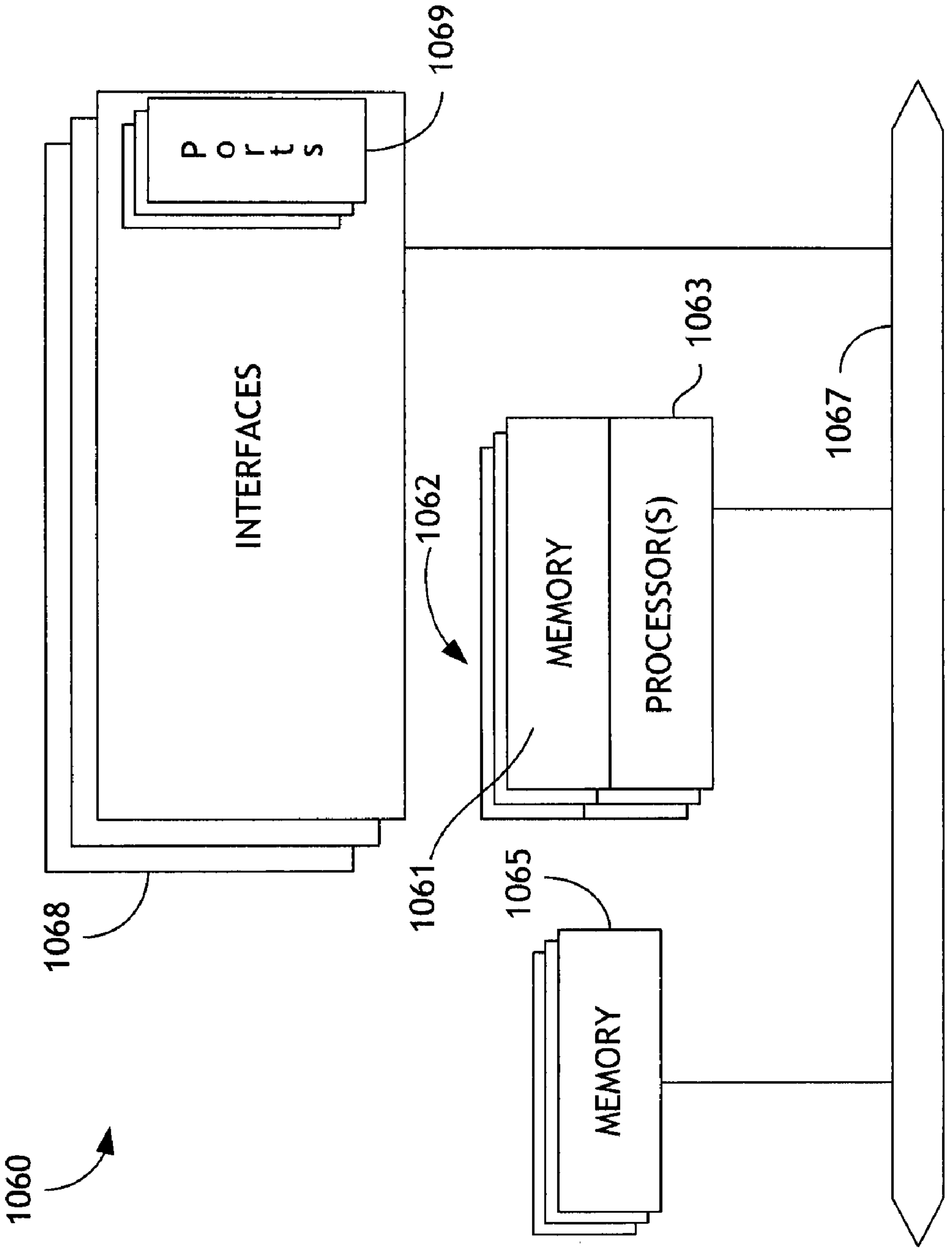
FIG. 10 is a block diagram of an exemplary network device that may be configured as a game server to implement some methods of the present invention.

FIG. 10 illustrates an example of a network device that may be configured as a game server for implementing some methods of the present invention. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1068 control such communications-intensive tasks as media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "linecards"). Generally, interfaces 1068 control the sending and receiving of data packets over the network and sometimes support other peripherals used with the network device 1060. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 10 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 10) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention. Conversely, the steps in some processes and/or components in some embodiments may be combined within the scope of the present invention.

Although the foregoing invention has been described in some detail for purposes of clarity of understanding, it will be apparent that certain changes and modifications may be practiced within the scope of the appended claims. For example, some alternative bingo-type implementations do not cause cards corresponding to undaubed numbers to be "slept" for the purposes of determining a hand of cards. In some bingo-type implementations, the draw for the game takes place before the players know the arrangements on their Bingo cards. Some such implementations involve exposing previously purchased Bingo cards.

Some implementations of the invention allow a player to view one or more draw cards prior to determining which cards to hold. In some such implementations, the player may view the first draw card for a fee, the first two draw cards for a higher fee, and so on. In exchange for a fee, some implementations allow a player to select draw cards out of the normal sequence. For example, if a player paid to see the first two draw cards, the player could choose the second draw card but not the first draw card. In preferred implementations, the possible interim win payouts to the player are reduced if the player chooses to view one or more draw cards in advance.

However, in some cases it will be to the player's advantage to choose not to "peek," because the cost of the peek will be greater than the probable value to be gained from it. One example of this situation is when the player is dealt a sufficient win (e.g. 4 of a kind), so that it's not worth peeking.

The invention claimed is:

1. A gaming method, comprising:

providing an initial hand of a card game to a player;

making an offer to provide the player with an amount of the game information for a price, the game information comprising draw card information about a plurality of cards available to be drawn to replace cards of the initial hand, the offer not requiring the player to draw any card in order to accept the offer;

determining whether the player has accepted the offer; and reducing the player's odds of winning the wagering game when the player accepts the offer.

2. The gaming method of claim 1, wherein the card game comprises a poker game.

3. The gaming method of claim 1, wherein the price varies according to the amount of game information provided to the player.

4. The gaming method of claim 1, wherein the step of reducing the player's odds of winning comprises decreasing a paytable percentage when the player accepts the offer.

5. The gaming method of claim 1, wherein the player's odds of winning decrease according to the amount of game information provided to the player.

6. The gaming method of claim 1, further comprising the step of reducing a maximum win amount when the player accepts the offer.

7. The gaming method of claim 2, further comprising the step of allowing the player to select draw cards according to normal rules of the poker game.

8. The gaming method of claim 2, further comprising the step of allowing the player to select draw cards in any order, whether or not the order would violate normal rules of the poker game.

9. The gaming method of claim 4, wherein the paytable percentage is reduced to a percentage that is above an actual payout percentage, taking into account players' mistakes, that applies when players do not accept the offer.

10. Computer software embodied in a machine-readable medium, the computer software containing instructions for controlling at least one device in a gaming network to perform the following steps:

providing an initial hand of a card game to a player;

making an offer to provide the player with an amount of the game information for a price, the game information comprising draw card information about a plurality of cards available to be drawn to replace cards of the initial hand, the offer not requiring the player to draw any card in order to accept the offer;

determining whether the player has accepted the offer; and reducing the player's odds of winning the wagering game when the player accepts the offer.

11. The computer software of claim 10, wherein the card game comprises a poker game.

12. The computer software of claim 10, wherein the price varies according to the amount of game information provided to the player.

13. The computer software of claim 10, wherein the step of reducing the player's odds of winning comprises decreasing a paytable percentage when the player accepts the offer.

14. The computer software of claim 10, wherein the player's odds of winning decrease according to the amount of game information provided to the player.

15. The computer software of claim 10, further comprising instructions for controlling at least one device in a gaming network to reduce a maximum win amount when the player accepts the offer.

16. The computer software of claim 11, further comprising instructions for controlling at least one device in a gaming network to allow the player to select draw cards according to normal rules of the poker game.

17. The computer software of claim 11, further comprising instructions for controlling at least one device in a gaming network to allow the player to select draw cards in any order, whether or not the order would violate normal rules of the poker game.

18. The computer software of claim 13, further comprising instructions for controlling at least one device in a gaming network to reduce the paytable percentage to a percentage that is above an actual payout percentage, taking into account players' mistakes, that applies when players do not accept the offer.

19. A gaming network, comprising:

means for providing an initial hand of a card game to a player;

means for making an offer to provide the player with an amount of the game information for a price, the game information comprising draw card information about a plurality of cards available to be drawn to replace cards of the initial hand, the offer not requiring the player to draw any card in order to accept the offer;

means for determining whether the player has accepted the offer; and means for reducing the player's odds of winning the wagering game when the player accepts the offer.

20. A gaming machine, comprising:

means for providing an initial hand of a card game to a player;

means for making an offer to provide the player with an amount of the game information for a price, the game information comprising draw card information about a plurality of cards available to be drawn to replace cards of the initial hand, the offer not requiring the player to draw any card in order to accept the offer;

means for determining whether the player has accepted the offer; and means for reducing the player's odds of winning the wagering game when the player accepts the offer.

21. A gaming network, comprising:

a game server, comprising:

a first network interface for communication with gaming machines on a gaming network; and a logic device for controlling the gaming machines, via the gaming network; a plurality of gaming machines, comprising:

a second network interface for communication with the game server; and means for providing an initial hand of a card game to a player;

means for making an offer to provide the player with an amount of the game information for a price, the game information comprising draw card information about a plurality of cards available to be drawn to replace cards of the initial hand, the offer not requiring the player to draw any card in order to accept the offer;

means for determining whether the player has accepted the offer; and means for informing the game server whether the player accepts an offer;

wherein the logic device is configured to reduce the player's odds of winning the wagering game when the player accepts the offer.

22. A gaming machine, comprising:

apparatus for presenting a wagering game, the apparatus including at least one video monitor;

at least one player input device;

a master gaming controller configured to control the apparatus for presenting the wagering game to perform the following steps:

providing an initial hand of a card game to a player; and offer, for a price, to provide the player with an amount of the game information, the game information comprising draw card information about plurality of cards available to be drawn to replace cards of the initial hand, the offer not requiring the player to draw any card in order to accept the offer;

wherein the master gaming controller is further configured to determine, according to information from at least one player input device, when the player has accepted the offer; and wherein the master gaming controller is further configured to reduce the player's odds of winning the wagering game when the master gaming controller determines that the player has accepted the offer.

* * * * *